(12) United States Patent
Jinno

(10) Patent No.: US 6,565,097 B2
(45) Date of Patent: May 20, 2003

(54) CYLINDER HEAD GASKET

(75) Inventor: Osamu Jinno, Toyota (JP)

(73) Assignee: Taiho Kogyo Co., Ltd., Toyota (JP)

( * ) Notice: Subject to any disclaimer, the term of this patent is extended or adjusted under 35 U.S.C. 154(b) by 0 days.

(21) Appl. No.: 09/782,824

(22) Filed: Feb. 14, 2001

(65) Prior Publication Data

US 2001/0017446 A1 Aug. 30, 2001

(30) Foreign Application Priority Data

Feb. 25, 2000 (JP) .......................... 2000-049862

(51) Int. Cl.[7] .................................. F02F 11/00
(52) U.S. Cl. ..................... 277/592; 277/593; 277/594; 277/595
(58) Field of Search ................. 277/592, 593, 277/594, 595

(56) References Cited

U.S. PATENT DOCUMENTS

| | | | |
|---|---|---|---|
| 5,286,039 A | * | 2/1994 | Kawaguchi et al. |
| 5,431,418 A | * | 7/1995 | Hagiwara et al. |
| 6,152,456 A | * | 11/2000 | Ziegler |
| 6,250,644 B1 | * | 6/2001 | Diez et al. |

FOREIGN PATENT DOCUMENTS

JP        9-317890        12/1997

* cited by examiner

*Primary Examiner*—Anthony Knight
*Assistant Examiner*—Karlena Schwing
(74) *Attorney, Agent, or Firm*—Flynn, Thiel, Boutell & Tanis, P.C.

(57) ABSTRACT

A cylinder head gasket comprises a plate, an annular groove formed to surround a combustion chamber opening formed in the plate, a metallic shim fitted into the annular groove, and a full bead located outward of the shim and projecting in the same direction as the shim. The shim is mounted on the plate by an intermittent welding.

With this construction, the manufacturing cost can be reduced in comparison to the use of a conventional continuous welding or multi-layer welding. In addition, the thermal deformation of the shim and the plate itself is reduced as compared with when continuous welding or multi-layer welding is used, thus allowing the sealing capability to be improved. In addition, the cylinder head gasket is preferred for use in an engine of a higher combustion temperature than the combustion temperature when the shim is formed of a resinous material.

7 Claims, 3 Drawing Sheets

CYLINDER HEAD GASKET

FIELD OF THE INVENTION

The invention relates to a cylinder head gasket used in an engine, and more particularly, to an improvement in a cylinder head gasket having a shim which surrounds a combustion chamber opening.

DESCRIPTION OF THE PRIOR ART

A cylinder head gasket is generally known in the art which is of the type having an annular metallic shim welded to a flat portion around a combustion chamber opening formed in a metal plate. A cylinder head gasket is also known in the art (see Japanese Laid-Open Patent Application No. 317,890/1997) which comprises an annular groove which surrounds a combustion chamber opening formed in a metal plate, an annular shim fitted into the annular groove, and an annular bead located outwardly of the shim and projecting in the same direction as the shim.

Recently, as a higher efficiency is required of an engine, the engine combustion temperature has risen. With an increase in the combustion temperature, there is an increased temperature differential between cold and hot states of the engine, thus increasing the differential thermal expansion between a cylinder block and a cylinder head. With a former type mentioned above in which a metallic shim is welded to the flat portion, a continuous welding or a multi-layer welding must be applied in order to secure adequate mounting strength. However, such a welding results in an increase in the manufacturing cost obviously, and in addition, the heat applied during the welding operation causes an increased distortion of the shim and the plate itself, thus degrading the sealing capability and presenting a difficulty when assembling it into an engine.

With the latter type disclosed in the cited Application, the use of a resin material for the shim may give rise to a problem in respect of the heat resistance when the combustion temperature is high.

SUMMARY OF THE INVENTION

In view of the forgoing, the present invention provides a cylinder head gasket which is preferred for use in an engine of a higher combustion temperature than in the prior art.

Specifically, in a cylinder head gasket which is constructed in the similar manner as a conventional cylinder head gasket, in accordance with the present invention, an annular projecting step is formed from the metal plate so as to surround the combustion chamber opening to thereby define the annular groove inside the projecting step, and the shim which is fitted into the annular groove is formed of a metal material and is welded to the plate in an interrupted manner circumferentially.

With the arrangement of the invention, while the shim is welded to the metal plate in an interrupted manner, the differential thermal expansion which acts on the shim is resisted to a degree by the side wall of the annular groove, and hence the intermittent welding, which provides an inferior mounting strength as compared with the continuous welding or the multi-layer welding, can be employed.

As a consequence, the required cost can be reduced as compared with the use of the continuous welding or the multi-layer welding. In addition, the thermal deformation which occurs in the shim and the plate itself can be reduced as compared with the use of the continuous welding or the multi-layered welding, enabling the sealing capability to be improved.

A shim formed of a metal material exhibits a higher heat resistance than a shim which is formed of a resinous material, and is preferred for use with an engine of a higher combustion temperature than in a conventional cylinder head gasket which uses a shim formed of a resinous material.

Above and other objects, features and advantages of the invention will become apparent from the following description of several embodiments thereof with reference to the attached drawings.

DETAILED DESCRIPTION OF THE EMBODIMENTS

Figure 1:
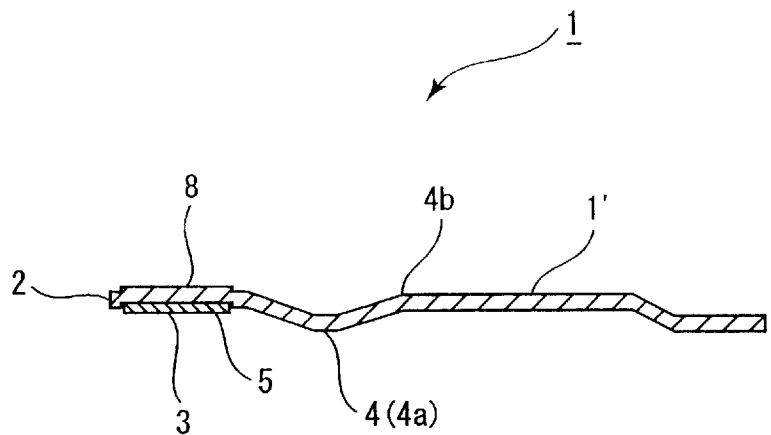
FIG. 1 is a cross section of a cylinder head gasket 1 according to a first embodiment of the invention.

Several embodiments of the invention in which the present invention is applied to a cylinder head gasket 1 of a multi-cylinder engine will now be described. In FIG. 1, a gasket 1 comprises a single plate 1', which is a resilient metal plate, disposed for contact with a cylinder block and a cylinder head, both not shown. The plate 1 is formed with a combustion chamber opening 2 which is formed in alignment with a cylinder bore of an engine, bolt openings, not shown, and water/oil openings through which a cooling water and/or oil is passed.

The gasket 1 is interposed between a cylinder block and a cylinder head of an engine, and provides a seal therebetween when clamping bolts passing through the bolt openings are used to connect the cylinder block and the cylinder head together integrally to hold the gasket sandwiched therebetween.

The plate 1' includes a shim 3 which surrounds the combustion chamber opening 2 and projects toward the cylinder block, whereby the pressure of contact surfaces is locally increased between the shim 3 and the cylinder block and the cylinder head.

The plate 1' also includes a full bead 4 which surrounds the shim 3 and which projects in the same direction as the shim. The pressure of contact surfaces is increased between an apex 4a of the full bead 4 and the cylinder head and also between a skirt 4b of the bead 4 and the cylinder block.

The projection height of the shim 3 is chosen to be less than the projection height of the full bead 4. In this manner, a high surface pressure is acquired by the shim 3 which has an increased rigidity while an excellent tracking capability is secured by the full bead 4 which exhibits high resilience with respect to a change in the clearance between the cylinder block and the cylinder head. Thus, the shim 3 prevents the full bead 4 from becoming fully squeezed.

Figure 2:
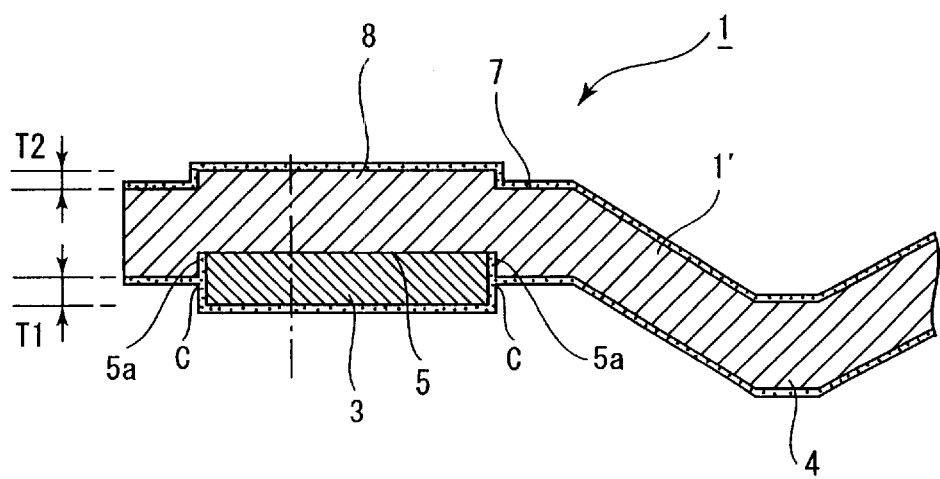
FIG. 2 is a cross section, to an enlarged scale, of an essential part shown in FIG. 1.

In the present embodiment, as shown to an enlarged scale in FIG. 2, an annular projecting step 8 is formed by a press operation of a flat portion 7 which surrounds the combustion chamber opening 2 to define an annular groove 5 inside the annular projecting step 8. The shim 3 comprises a metal material such as stainless steel and is fitted into the annular groove 5.

The shim 3 is mounted on and secured to the plate 1' by welding it to the plate 1' intermittently at given circumferential positions. Obviously, the shim 3 and plate 1' undergo differential thermal expansion, and such thermal expansion is also different from the thermal expansion of the cylinder block against which the shim 3 abuts and the cylinder head against which the plate 1' abuts. Accordingly, it would be considered necessary to apply a circumferentially continuous welding or a radially multiple welding to the shim to provide a sufficient mounting strength in order to overcome the differential thermal expansion involved with the cold and hot states of the engine. However, such continuous or multi-layer welding results in an increased manufacturing cost, and in addition, it causes a thermal deformation of the shim and the plate to cause a gas leakage from a clearance with the cylinder head or the cylinder block or to cause a difficulty in assembling it into an engine.

However, with the described arrangement of the present invention, if an intermittent welding, which provides an inferior strength in comparison to the continuous or the multi-layer welding, is employed, the differential thermal expansion which acts on the shim 3 can be resisted to a degree by a side wall 5a of the annular groove 5, presenting no problem whatsoever. (A clearance is shown in FIG. 2 between the shim 3 and the side wall 5a to illustrate the presence of a coating C permeating therebetween in an exaggerated manner.)

Thus, it will be appreciated from the forgoing description that the intermittent welding provides a sufficient accommodation without presenting any problems. In comparison to the use of the continuous or multi-layer welding, the use of the intermittent welding minimizes the manufacturing cost. In addition, the thermal deformation of the shim and plate is reduced in comparison to the use of the continuous or multi-layer welding, thus contributing to improving the sealing capability with respect to the cylinder head and/or cylinder block.

In the present embodiment, the annular groove 5 is formed as a result of a press operation which forms the projecting step 8. This provides an additional advantage that the sealing capability on the side which is opposite from the shim can be improved by locally increasing the surface pressure on the side which is opposite from the shim by the presence of the projecting step 8 as compared with the formation of an annular groove by a cutting operation which provides an entirely flat surface at a location inside of the bead, for example.

In the present embodiment, the coating C is applied to the entire both surfaces of the cylinder head gasket 1 having the shim 3 attached to the plate 1', thus allowing the coating C to prevent in a positive manner a leakage of a combustion gas from between the shim 3 and the plate 1'.

In the present embodiment, the projection height T1 of the shim 3 is chosen to be greater than the projection height T2 of the projecting step 8, and the bead 4 is arranged to project in the same direction as the shim 3 having the greater projection height, thereby preventing an excessive compression of and a premature loss of resilience of the bead 4. In the event the projection height T2 of the projecting step 8 is chosen to be greater than the projection height T1 of the shim 3, the bead 4 is arranged to project in the same direction as the projecting step 8.

The shim 3 of the present embodiment provides more heat resistance than a shim formed of a resin material. Specifically, while the temperature influencing the shim 3 depends on the variety of the engine, it generally lies in a range from about 200 to 300 degrees, which is very close to the thermally durable limit of a resin material. By contrast, the shim 3 formed of a metal material can accommodate such a temperature without any problem, and hence is preferred for use in an engine having a combustion temperature which imposes a thermally high load on a resin material. In addition, the shim 3 formed of a metal material can be shaped with a high precision in comparison to a shim formed of a resin material. Specifically, the shim 3 formed of a metal material can be manufactured with a precision on the order of 1 micron, while a shim formed of a resin material can only be manufactured with precision on the order of 10 microns at best, and the higher precision leads to an improvement of the sealing capability.

In the described embodiment, the shim 3 and the full bead 4 are disposed to face the cylinder block, but the arrangement is not limited thereto, and they may be disposed to face the cylinder head.

Figure 3:
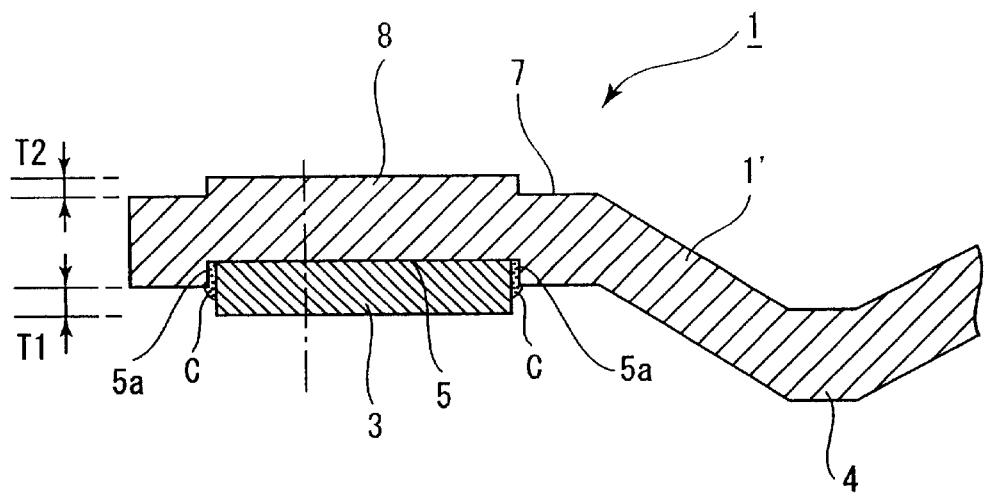
FIG. 3 is a similar view to FIG. 2, illustrating that a coating C locally fills a clearance between a shim 3 and an annular groove 5.

Also in the described embodiment, the coating C is applied to the entire both surfaces of the cylinder head gasket 1, but the invention is not limited thereto, but instead, as shown in FIG. 3, the coating C may locally fill a clearance between the annular groove 5 and the shim 3.

Figure 4:
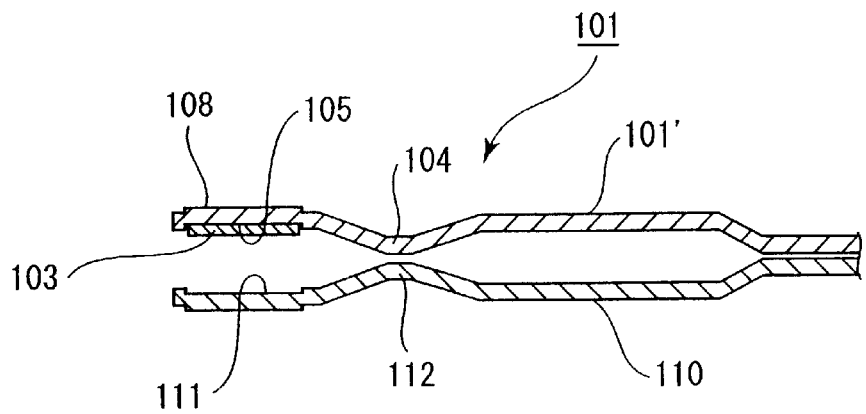
FIG. 4 is a cross section of a cylinder head gasket 101 according to a second embodiment of the invention.

FIG. 4 shows a second embodiment of the invention. In the first embodiment, a single layer cylinder head gasket 1 comprising a single plate 1' and a single shim 3 is illustrated. However, in the present embodiment, a cylinder head gasket 101 comprises a pair of plates 101', 110 which are disposed one above another, and a shim 103 which is secured inside an annular groove 105 formed in the upper plate 101' and is adapted to be held between annular grooves 105, 111 formed in both plates 101', 110.

Thus, the combination of the upper plate 101' and the shim 103 comprises the same structure as provided by the first embodiment, and a lower plate 110 is constructed symmetrically in the vertical direction with respect to the upper plate 101' except that the lower plate 110 is not provided with a shim.

The shim 103 is intermittently welded to the plate 101' in the similar manner as in the first embodiment, and a coating C fills the clearance between the shim 103 and the annular groove 105 which accommodates it.

When the cylinder head gasket 101 is held sandwiched between the cylinder head and the cylinder block, the bead 104 of the upper plate 101' and the bead 112 of the lower plate 110 abut against each other to experience a compressive deformation (not shown), and the shim 103 on the upper plate 101' and an annular groove 111 formed in the lower plate 110 move toward each other, and the shim 103 is eventually received in the annular groove 111 to be abutted against the bottom of the annular groove 111. As a consequence, while the shim 103 is not welded to the lower plate 110, it assumes a condition in which it is substantially welded thereto as a result of the action of the annular groove 111 which accommodates the shim 103.

Accordingly, the laminated cylinder head gasket 101 of the present embodiment allows the manufacturing cost to be reduced in comparison to the continuous welding of the shim, and is preferred for use in an engine having a higher combustion temperature than that allowable with the use of a shim formed of a resin material while improving the sealing capability.

Figure 5:
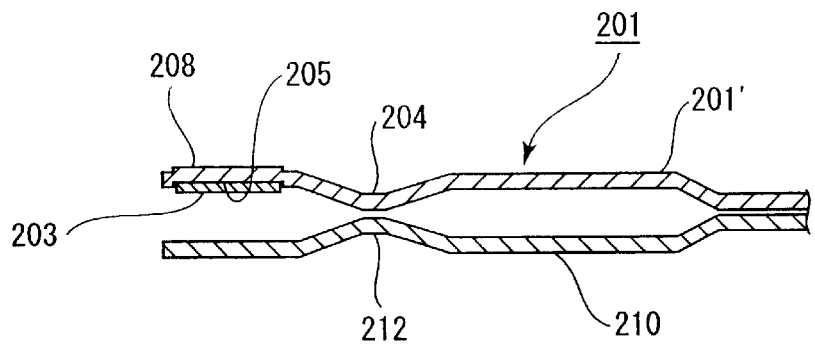
FIG. 5 is a cross section of a cylinder head gasket 201 according to a third embodiment of the invention.

FIG. 5 shows a third embodiment-of the present invention in which the annular groove 111 formed in the plate 110 of the second embodiment is omitted to provide a flat plate.

With a laminated cylinder head gasket 201 constructed in this manner, a similar functioning and effect as achieved by the second embodiment can be achieved except that the stopping effect applied to the shim 103 by the annular groove 111 in the plate 110 is lacking in distinction to the second embodiment.

Figure 6:
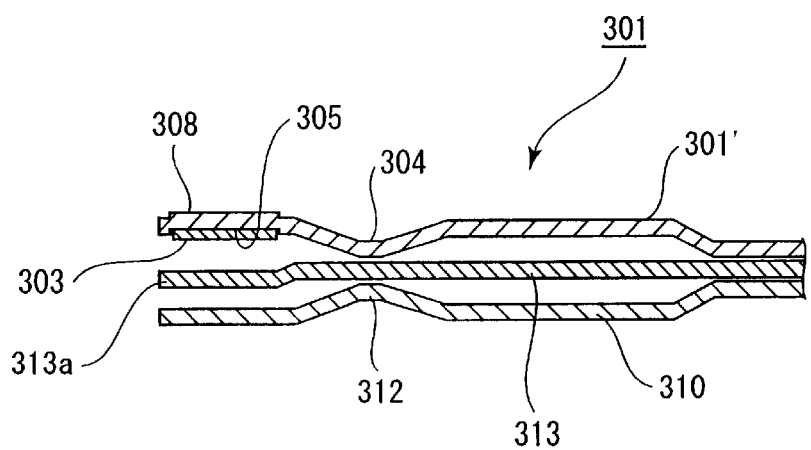
FIG. 6 is a cross section of a cylinder head gasket 301 according to a fourth embodiment of the invention.

FIG. 6 shows a fourth embodiment of the invention. In the third embodiment, the cylinder head gasket 201 comprises a pair of plates 201 and 210, but in the present embodiment, a single inner plate 313 is disposed between a pair of plates 301 and 310.

A projecting step 313a which projects in the same direction as a shim 303 is formed around a combustion chamber opening formed in the inner plate 313. The projection height of the projecting step 313 is chosen to be equal to or slightly less than the projection height of the shim 303, whereby when the cylinder head gasket is held sandwiched between the cylinder head and the cylinder block, the shim 303 abuts against the projecting step 313a of the inner plate 313 which in turn abuts against a portion of the plate 310 which is located inward of the full bead 307. In other respects, the arrangement is similar to the third embodiment.

The fourth embodiment constructed in this manner is capable of achieving a similar functioning and effect as achieved by the third embodiment.

It should be understood that in the first to the fourth embodiments, the projection height of the shim may vary in the circumferential direction.

In the first to the fourth embodiments mentioned above, a full bead is used, but the invention is not limited thereto and may be replaced by a half bead.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A cylinder head gasket comprising a metal plate, a combustion chamber opening formed in the metal plate, an annular groove formed in said metal plate and surrounding the combustion chamber opening, an annular shim fitted into the annular groove and an annular bead located outwardly from the annular shim and surrounding the combustion chamber opening;

characterized in that an annular projecting step is formed in the metal plate surrounding the combustion chamber opening and opposite to the annular groove, the annular groove is provided with inner and outer sidewalls in the radial direction and the annular shim is made of a metallic material and intermittently welded to the metal plate in the circumferential direction.

2. A cylinder head gasket according to claim 1, characterized in that said annular bead projects from the surface of the metal plate in the same direction as the annular shim and the projection height of the annular shim is lower than that of the annular bead.

3. A cylinder head gasket according to claim 1, wherein a coating is provided between the annular shim and the annular groove.

4. A cylinder head gasket according to claim 1, wherein the projection height of the annular shim is greater than the projection height of the annular projecting step.

5. A cylinder head gasket according to claim 1, additionally comprising a coating provided on opposite surfaces thereof.

6. A cylinder head gasket according to claim 1, wherein the annular shim comprises stainless steel.

7. A cylinder head gasket according to claim 1, wherein the projecting height of the projecting step is greater than that of the annular shim and the annular bead projects in the same direction as the projecting step.

* * * * *